(12) United States Patent
Persson

(10) Patent No.: US 6,556,829 B1
(45) Date of Patent: *Apr. 29, 2003

(54) MOBILE COMMUNICATIONS SYSTEM

(75) Inventor: Gunnar Persson, Vikingstad (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,362

(22) Filed: Jun. 29, 1998

(30) Foreign Application Priority Data

Jun. 30, 1997 (GB) ............................................. 9713807

(51) Int. Cl.⁷ ................................................ H04Q 7/20
(52) U.S. Cl. ...................... 455/437; 455/67.1; 455/447; 370/332
(58) Field of Search ................................ 455/13.3, 447, 455/63, 428, 446, 67.1, 524, 436, 437, 438, 439, 442, 434, 423; 370/252, 331–334, 337

(56) References Cited

U.S. PATENT DOCUMENTS

| 4,747,101 | A | | 5/1988 | Akaiwa et al. | |
|---|---|---|---|---|---|
| 5,008,953 | A | | 4/1991 | Dahlin et al. | |
| 5,267,261 | A | * | 11/1993 | Blakeney, II et al. | 375/1 |
| 5,327,575 | A | * | 7/1994 | Menich et al. | 455/437 |
| 5,327,576 | A | | 7/1994 | Uddenfeldt et al. | |
| 5,428,816 | A | | 6/1995 | Barnett et al. | |
| 5,884,196 | A | * | 3/1999 | Lekven et al. | 455/574 |
| 5,915,221 | A | * | 6/1999 | Sawyer et al. | 455/437 |
| 5,926,762 | A | * | 7/1999 | Arpee et al. | 455/447 |
| 5,966,657 | A | * | 10/1999 | Sporre | 455/425 |
| 5,974,320 | A | * | 10/1999 | Ward et al. | 455/437 |
| 6,028,854 | A | * | 2/2000 | Raith et al. | 370/347 |
| 6,249,678 | B1 | * | 6/2001 | Mathai et al. | 455/437 |

* cited by examiner

Primary Examiner—Edward F. Urban
Assistant Examiner—Charles Craver

(57) ABSTRACT

A base station, as is conventional, directs mobile stations within its cell to make measurements on channels used by neighbouring cells. The base station also directs the mobile stations to make measurements on an additional channel not used by a neighbouring cell. The additional channel is changed regularly. Measurements made on the additional channel are useful when assessing the potential impact of changes to the frequency reuse plan.

18 Claims, 2 Drawing Sheets

| CELL | C1 | C2 | C3 | C4 | C5 | C6 | C7 | C8 |
|---|---|---|---|---|---|---|---|---|
| FREQUENCY | f1 | f2 | f3 | f4 | f5 | f6 | f7 | f6 |
| CELL | C9 | C10 | C11 | C12 | C13 | C14 | C15 | C16 |
| FREQUENCY | f8 | f2 | f9 | f10 | f8 | f11 | f12 | f13 |

FIG. 2

- S1 — DETERMINE OPERATING FREQUENCIES OF NEIGHBOURING CELLS
- S2 — DETERMINE COLOUR CODES OF NEIGHBOURING CELLS
- S3 — SELECT ADDITIONAL OPERATING FREQUENCY
- S4 — MAKE LIST OF PRESELECTED FREQUENCIES
- S5 — SEND INSTRUCTIONS TO MOBILE STATION TO MAKE MEASUREMENTS ON PRESELECTED FREQUENCIES
- S6 — RECEIVE COLOUR CODES OF SIGNALS RECEIVED FROM MOBILE STATION
- S7 — COMPARE COLOUR CODES OF SIGNALS RECEIVED BY MOBILE STATION WITH COLOUR CODES OF NEIGHBOURING CELLS
- S8 — IDENTIFY CELL TRANSMITTING SIGNAL RECEIVED BY MOBILE STATION ON ADDITIONAL OPERATING FREQUENCY
- S9 — REPORT RESULTS

FIG. 3

MOBILE COMMUNICATIONS SYSTEM

TECHNICAL FIELD OF THE INVENTION

This application claims priority under 35 U.S.C. §§119 and/or 365 to 9713807.7 filed in United Kingdom on Jun. 30, 1997; the entire content of which is hereby incorporated by reference.

This invention relates to a mobile communications system, and in particular to a base station, and a method of operation thereof, intended to provide information for use in network planning.

DESCRIPTION OF RELATED ART

A cellular mobile telephone system consists of a number of base stations, a number of mobile stations and at least one mobile switching centre (MSC).

The geographical area in which all mobile stations are connected to the same base station is called a cell. The number of cells in a network is normally greater than the number of available frequencies. The same frequency must therefore be used by a number of cells. To prevent interference between cells using the same frequency, the assignment of frequencies to different cells must be carefully planned.

When a mobile station moves around in the network, it must sometimes change the base station to which it is connected. This procedure is called handover. It is not possible to perform handover between any cells in the network. For each cell, a limited number of other cells, to which handover is possible, must be defined in the system. These cells are called neighbours or neighbouring cells to the first cell, and must naturally operate on different frequencies from the first cell.

At every handover attempt there is always a risk that the signal quality is insufficient for the mobile station to establish a new radio connection with any of the defined neighbouring cells. This will result in dropped calls. If it is possible to increase the number of defined neighbours, this would of course increase the possibility to accomplish the handover successfully.

A mobile station must always take measurements on signal quality and signal strength for all the defined neighbouring cells, otherwise it would not be possible to decide to which of the neighbouring cells a possible handover should be performed. For each new neighbouring cell relation we define for a cell, we must increase the number of frequencies for every mobile station in that cell to take measurements on. This will increase the load on the mobile stations and thereby reduce the quality of the measurements.

Here we have a conflict, too many defined neighbouring cells gives less risk of dropped calls, but it will increase the system load. On the other hand, if we define too few neighbours, we will have a low system load, but the risk of losing calls will be too high. It is essential in network planning to always define the best neighbours, and not too many to each cell in the network.

The making of power and quality measurements is defined in, for example, the GSM system in GSM Technical Specification 04.08.

To summarise, there are two major problems in network planning. First, there is frequency planning. This means making decisions as to which frequency or frequencies to assign to each cell in the network. This must be done very carefully, in order to maximise the system capacity, at the same time as the interference level between cells using the same frequency must be kept to a minimum. The second problem is to define the best neighbouring relations, for all cells in the network. Both these problems are hard for the operator, or network administrator, to deal with, and every tool, or mechanism, that could make it easier for the operator to do this planning is surely appreciated.

The main purpose with the invention is to deal with the optimal neighbouring relation problem.

SUMMARY OF THE INVENTION

It is an object of the present invention to use a technique, similar to that described above, to provide additional information to a network operator about possible neighbouring relations which might be defined.

It is a further object of the invention to determine new channel allocations which might improve the performance of the network.

Specifically, in addition to directing mobile stations to make measurements on the channels used by the known neighbouring cells, a base station also directs mobile stations to make measurements on other channels in use within the network. Instructions are sent to the mobile stations from the base stations, but the intelligence which decides on the additional measurements to be made may reside in a base station controller, which is connected to several base stations. As used herein, the term "base station" is intended to encompass the device located in a specific cell, as well as any base station controller which originates any messages controlling that device.

The results of these measurements can be used to obtain statistics about signal quality within a cell from many or all other cells in the network. These statistics can be used to find new neighbouring relations which might usefully be defined.

The information obtained thereby can be used to improve the performance of the cellular network.

BRIEF DESCRIPTION OF DRAWINGS

FIG. 2 is a table showing the frequencies allocated to cells in the network of FIG. 1.

FIG. 3 is a flow chart illustrating the method carried out in a base station in accordance with the invention.

DETAILED DESCRIPTION OF PREFERRED EMBODIMENTS

Figure 1:
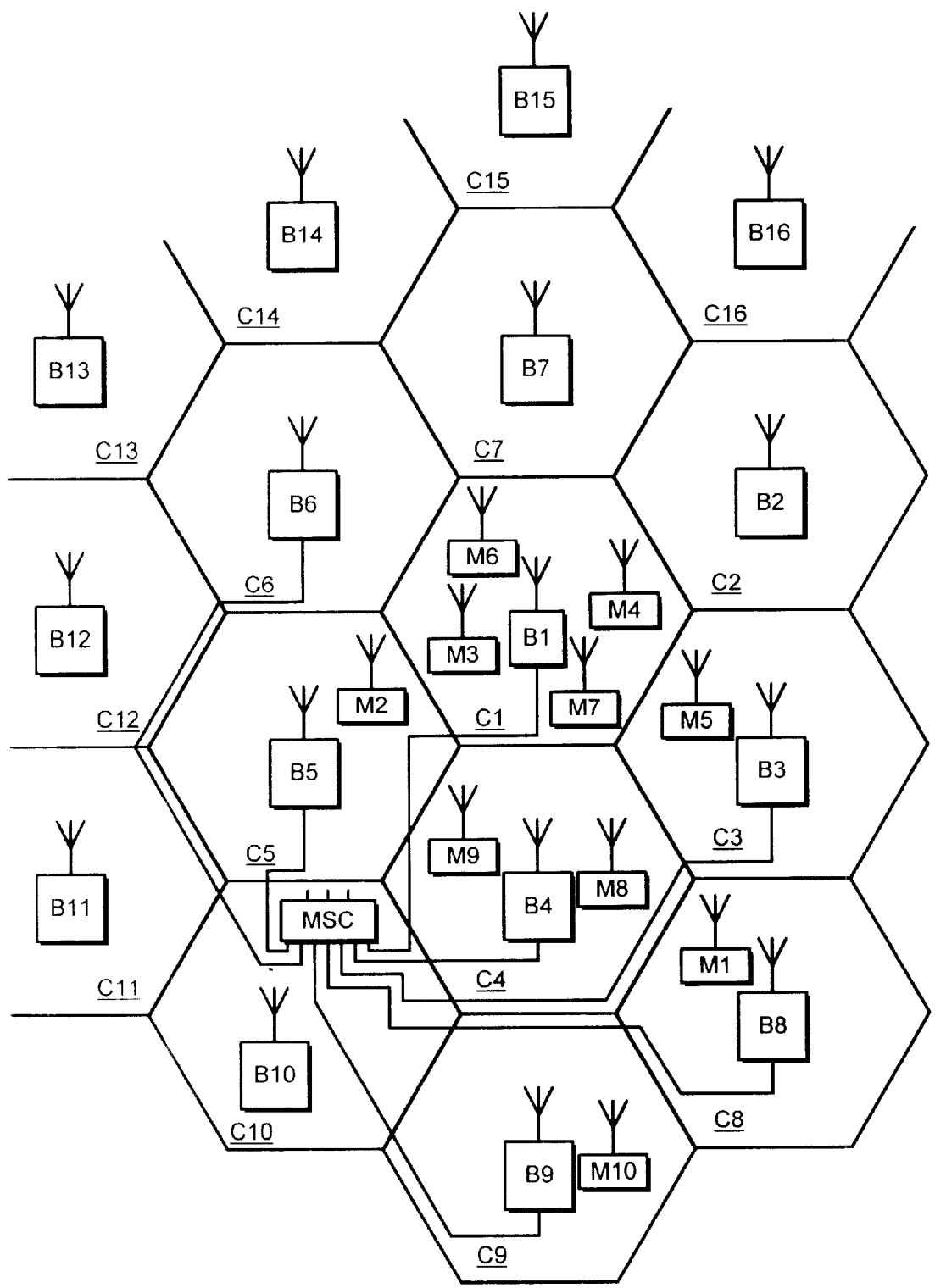
FIG. 1 is a schematic representation of a part of a cellular communications network.

FIG. 1 is a schematic diagram illustrating a part of a cellular mobile radio telephone system. FIG. 1 shows sixteen cells C1–C16, although it will be appreciated that the complete network includes many more cells than this. Each cell C1–C16 includes a respective base station B1–B16, located near the centre of the respective cell, and having an omnidirectional antenna. It will be appreciated that, instead, base stations may be located near the borders between cells, and may have directional antennas. The antenna of a base station may send or receive traffic-carrying signals, or control signals or other information, for example as described below.

FIG. 1 also shows a base station controller, or mobile switching centre MSC, which is connected by cables to all of the base stations B1–B16, and is also connected to a fixed telephone network such as a PSTN or ISDN. Not all of these cables are shown in FIG. 1, and, indeed, communications between the base stations and the base station controller may be made in other ways, for example over fixed radio links.

FIG. 1 also shows ten of the mobile stations M1–M10 used by subscribers to the network. These mobile stations are moveable throughout the area covered by the network.

The network is able to operate on a number of channels, or operating frequencies. However, the number of available frequencies is less than the number of cells in the network. As a result, frequencies must be reused, and an important part of the network planning is the arrangement of the way in which the frequencies are reused.

FIG. 2 is a table showing the frequencies f1–f13 allocated to the cells C1–C16 at one point in time, although it will be appreciated that the channel allocations may be altered by the network operator. As shown in FIG. 2, in the network shown in FIG. 1, the base stations B2 and B10 may transmit on the same frequency f2, and similarly the base stations B6 and B8 may also operate on the same frequency f6 as each other. However, problems can arise if, for example, a mobile station within the cell C6 is able to receive transmissions from the cell C8 with a signal strength approaching the signal strength of transmissions from its own base station B6.

In order to provide information about the performance of the network, and the frequency reuse pattern, information is gathered from mobile stations which are in operation within the network.

In the example shown in FIG. 1, the base station B1 sends messages to the mobile stations, M3, M4, M6 and M7, operating within the cell C1, instructing them to take measurements (which might, for example, be signal strength measurements or some other measurements indicating signal quality), on the frequencies of operation f2–f7 of the cells which border the cell C1. These cells are defined within the system as neighbouring cells. When a mobile station detects transmissions on one of these frequencies with a sufficient signal strength, it also is able to recognise, by means of a colour code signal transmitted by the base station, which of the base stations, out of perhaps several base stations within the network using that frequency, has transmitted the signal which it receives. For example, in the situation described above, if the mobile station M3 detects a signal on the channel with frequency f6 which is shared by the base stations B6 and B8, it is able to determine from the colour code associated with that signal, whether the signal has been transmitted by the base station B6 or the base station B8 (or indeed by any other base station sharing that channel). Normally, it would be expected that the mobile station M3 would be able to detect the transmissions from the base station B6, without interference from the base station B8. However, if the mobile station M3 does detect a signal transmitted by the base station B8, this indicates that there is a possibility that a mobile station within the cell C6, attempting to communicate with the base station B6, may suffer interference by transmissions from the base station B8.

Messages are sent from the mobile station to the base station identifying the signals detected, and, in the event that the base station determines that a signal from a non-neighbouring cell has been detected, it sends a message to the base station controller MSC, which can provide a report to the system operator.

This information can be used in assessing the performance of the network.

In addition, in accordance with the invention, information can be provided which allows the system operator to determine whether changes to the defined neighbouring relationships might be beneficial, and also to assess the impact of changes to the frequency reuse plan which may be under consideration.

As described above, the base station B1 instructs mobile stations within the cell C1 to carry out measurements on the channels used by the neighbouring cells C2–C7, that is the frequencies f2–f7. In addition, in accordance with the invention, the base station B1 also instructs the mobile stations active within the cell C1 to carry out a measurement on one of the other channels in use in the network, that is, in the illustrated embodiment, one of the frequencies f8–f13. (These instructions may originate in the base station controller, which is responsible for gathering statistics for use by the network operator). Once a measurement has been made on one of those frequencies, the mobile stations are instructed during the next cycle of measurements to take measurements on another of them, and so on until all available frequencies within the network have been used for measurement purposes.

It should be noted that the measurements may be made on all frequencies available in the network as described above, or only on some of them, at the discretion of the network operator; measurements may be made on more than one of the non-neighbouring frequencies at any time; and measurements may be made on frequencies as regularly as the network operator may chose.

When a mobile station detects a transmission on one of these additional operating frequencies (f8–f13 in the example described above), the information about the detected transmission, including for example the colour code which identifies the base station which transmitted the detected signal, is stored, and may for example be transmitted to the base station controller MSC.

This information may, for example, be used in order to determine that, if a mobile station in the cell C1 can always detect signals transmitted on the frequency f13 from cell C16, then cell C16 can be designated as a neighbouring cell to cell C1. Similarly, if no mobile station within the cell C1 can detect any signals being transmitted on the frequency f12, then the base station B1 can be instructed to operate on that frequency without risk of co-channel interference by signals transmitted on that frequency from cell C15, or any other cell presently using that frequency.

FIG. 3 is a flow chart illustrating the method carried out by one of the base stations. This method is preferably carried out by each base station within the network. In step S1, the base station determines, either from stored information or from information transmitted by the base station controller MSC, the operating frequencies of the neighbouring cells C2–C7. At the same time, in step S2, the base station B1 determines the colour codes associated with signals transmitted from the neighbouring cells C2–C7. In step S3, the base station B1 selects an additional operating frequency, being used by one of the cells other than the neighbouring cells, for example the frequency f8, and in step S4 adds this to the list of operating frequencies f2–f7 of the neighbouring cells to form a list of preselected frequencies.

In step S5, the base station sends instructions to every mobile station active within the cell C1, to make measurements on the preselected frequencies within the list.

The mobile stations make the measurements, and report the results, including the colour codes associated with the signals which are detected (step S6).

In the base station B1, in step S7, the colour codes of the signals received on the frequencies f2–f7 are compared with the colour codes of the cells C2–C7, in order to determine whether any of the signals received on those frequencies are in fact potentially interfering signals from cells which are not defined as neighbouring cells.

In addition, in step S8, the base station B1 determines, from the colour code associated with the detected signal, which cell has originated the transmission detected on the additional operating frequency f8.

Finally, in step S9, the results obtained in step S7 and S8 are reported to the base station controller MSC.

There is thus provided a method of operation of the base station which allows the system operator to obtain useful information about the performance of the system, in order to be able to define the best possible "neighbouring cells" relations, and to assess the impact of possible changes to the frequency reuse pattern.

What is claimed is:

1. A method of operation of a mobile communications network for communication with a plurality of mobile stations, the network comprising a plurality of base stations, each base station being associated with a particular cell, each cell being identified within the network by a colour code signal transmitted by a base station within the cell, and each base station within a cell communicating with the respective mobile stations on an operating frequency chosen from a preselected number of available frequencies, the number of cells in the network being greater than the number of available frequencies, the method comprising:
   sending control signals to each respective mobile station, instructing it to make signal quality measurements on a plurality of frequencies, the plurality of frequencies remaining generally the same over time, and being the operating frequencies of neighbouring cells said neighbouring cells being the cells to which the mobile station may execute a handover if required;
   sending control signals to each respective mobile station, instructing it to make signal quality measurements on at least one additional frequency in use within the network, the additional frequency not being associated with any neighbouring cells, the additional frequency being changed frequently;
   receiving detected signal quality measurements made by each respective mobile station on the additional frequency;
   receiving a detected colour code associated with any signal detected on the additional frequency, the colour code being detected by one of the mobile stations;
   determining, on the basis of the detected colour code, the cell from which the signal detected on the additional frequency originated; and
   determining on the basis of the signal quality measurements whether said cell, from which the signal detected on the additional frequency originated, can be designated as a neighbouring cell to which a mobile station may execute a handover.

2. A method as claimed in claim 1, wherein the additional frequency is selected from all of the frequencies available within the network other than the plurality of frequencies of neighbouring cells.

3. A method as claimed in claim 1, wherein the additional frequency is selected from a subset of the available frequencies within the network other than the plurality of frequencies of neighbouring cells.

4. A method as claimed in claim 1, wherein the additional frequency is changed in each cycle of signal quality measurements.

5. A mobile communications network for communication with a plurality of mobile stations, the network comprising a plurality of base stations, each base station being associated with a particular cell, each base station within a cell communicating with each respective mobile station on an operating frequency chosen from a preselected number of frequencies available to the network operator, the number of cells in the network being greater than the number of available frequencies, each base station within the network comprising:
   means for transmitting a colour code signal, said colour code signal identifying the cell in which the base station resides;
   means for sending first control signals to each respective mobile station, instructing the mobile station to attempt to detect signals on frequencies within a first group of frequencies selected from the plurality of frequencies available within the network, the first group of frequencies being the operating frequencies of neighbouring cells to which a mobile station may execute a handover;
   means for sending second control signals to each respective mobile station, instructing the mobile station to attempt to detect a signal on at least one additional frequency in use within the network, the additional frequency not being associated with any neighbouring cells, the additional frequency being altered regularly;
   means for receiving the results of said attempts to detect a signal made by each respective mobile station on the additional frequency;
   means for receiving a detected colour code associated with any signal detected on the additional frequency, the colour code being detected by one of the mobile stations;
   the network further comprising:
      means for determining, on the basis of the detected colour code, the cell from which the signal detected on the additional frequency originated; and
      means for determining, on the basis of said results, whether said cell, from which the signal originated, can be designated as a neighbouring cell to which a mobile station may execute handover.

6. A mobile communications network as claimed in claim 5, further comprising means for selecting the additional frequency from all of the frequencies available within the network other than the plurality of frequencies of neighbouring cells.

7. A mobile communications network as claimed in claim 5, further comprising means for selecting the additional frequency from a subset of the frequencies available within the network other than the plurality of frequencies of neighbouring cells.

8. A mobile communications network as claimed in claim 5, further comprising means for changing the additional frequency in each cycle of signal quality measurements.

9. A mobile communications network as claimed in claim 5, wherein the means for determining the cell from which the signal detected on the additional frequency originated and the means for determining whether said cell can be designated as a neighbouring cell is within the base station.

10. A mobile communications network as claimed in claim 5, wherein the means for determining the cell from which the signal detected on the additional frequency originated and the means for determining whether said cell can be designated as a neighbouring cell is within a Mobile Switching Centre (MSC).

11. A base station for use in a radio communications network comprising a plurality of base stations and a plurality of available operating frequencies, the base station comprising:
   means for sending first messages to respective mobile devices, each first message instructing the mobile device to attempt to detect signals on frequencies within a first group of frequencies selected from the plurality of available operating frequencies, the first group of frequencies being the operating frequencies of base stations defined as neighbours of the base station;

means for comparing identifying codes of signals detected in response to the first message with identifying codes associated with the base stations defined as neighbours;

means for reporting if the detected identifying codes of signals detected in response to the first message differ from the identifying codes associated with the base stations defined as neighbours;

means for sending second messages to respective mobile devices, each second message instructing the mobile device to attempt to detect a signal on at least one second frequency not within the first group of frequencies; and means for reporting the identifying codes of any signals detected in response to the second message.

12. A base station as claimed in claim 11, further comprising means for selecting the second frequency from all of the available frequencies other than the first group of frequencies.

13. A base station as claimed in claim 11, further comprising means for selecting the second frequency from a subset of the available frequencies other than the first group of frequencies.

14. A base station as claimed in claim 11, further comprising means for changing the second frequency in each cycle of signal quality measurements.

15. A mobile communications network as claimed in claim 11, wherein the means for comparing colour codes of signals detected in response to a first control signal, the means for reporting if the colour codes differ from the colour codes associated with neighbouring cells in response to a first control signal, the means for determining the cell from which the signal detected on the additional frequency originated and the means for determining whether said cell can be designated as a neighbouring cell is within the base station.

16. A mobile communications network as claimed in claim 11, wherein the means for comparing colour codes of signals detected in response to a first control signal, the means for reporting if the colour codes differ from the colour codes associated with neighbouring cells in response to a first control signal, the means for determining the cell from which the signal detected on the additional frequency originated and the means for determining whether said cell can be designated as a neighbouring cell is within a Mobile Switching Centre (MSC).

17. A mobile communications network for communication with a plurality of mobile stations, the network comprising a plurality of base stations, each base station being associated with a particular cell, each base station within a cell communicating with each respective mobile station on an operating frequency chosen from a preselected number of frequencies available to the network operator, the number of cells in the network being greater than the number of available frequencies, each base station within the network comprising:

means for transmitting a colour code signal, said colour code signal identifying the cell in which the base station resides;

means for sending first control signals to each respective mobile station, instructing the mobile station to attempt to detect signals on frequencies within a first group of frequencies selected from the plurality of frequencies available within the network, the first group of frequencies being the operating frequencies of neighbouring cells to which a mobile station may execute a handover;

means for receiving the results to said attempts to detect a signal made by each respective mobile station on the first group of frequencies;

means for sending second control signals to each respective mobile station, instructing the mobile station to attempt to detect a signal on at least one additional frequency in use within the network, the additional frequency not being associated with any neighbouring cells, the additional frequency being altered regularly;

means for receiving the results of said attempts to detect a signal made by each respective mobile station on the additional frequency;

means for receiving the colour codes of any signals detected in response to the second control signal;

means for comparing colour codes of signals detected in response to the first control signal with colour codes associated with the neighbouring cells;

means for reporting if the colour codes of signals detected in response to the first control signal differ from the colour codes associated with the neighbouring cells;

means for determining, on the basis of the detected colour code, the cell from which the signal detected on the additional frequency originated; and means for determining, on the basis of said results, whether said cell, from which the signal originated, can be designated as a neighbouring cell to which a mobile station may execute a handover.

18. In a mobile communications network for communication with a plurality of mobile stations, the network comprising a plurality of base stations each base station being associated with a particular cell, each cell being identified within the network by a colour code signal transmitted by a base station within the cell, and each base station within a cell communicating with the respective mobile stations on an operating frequency chosen from a preselected number of available frequencies, the number of cells in the network being greater than the number of available frequencies, a method for assessing the performance of the network comprising the steps of:

sending first control signals instructing each respective mobile station to measure signals on a first group of frequencies selected from the plurality of frequencies available within the network, the first group of frequencies being associated with cells which are neighbouring cells to the cell in which the mobile station is currently located;

receiving the results of said attempts to detect a signal made by each respective mobile station on the first group of frequencies;

comparing a colour code of signals detected in response to the first control signal with colour codes associated with the neighbouring cells;

reporting the results of the comparing step, if any of the colour codes detected in response to the first control signal are different to the colour codes associated with the neighbouring cells;

sending second control signals to each respective mobile station, instructing the mobile station to attempt to detect a signal on at least one additional frequency in use within the network, the additional frequency not being associated with any neighbouring cells and the additional frequency being altered regularly;

receiving the results of said attempts to detect a signal made by each respective mobile station on the additional frequency;

receiving the colour codes of any signals detected in response to the second control signal;

determining, on the basis of the detected colour code, the cell from which the signal detected on the additional frequency originated; and determining, on the basis of said results, whether said cell, from which the signal originated, can be designated as a neighbouring cell to which a mobile station may execute a handover.

* * * * *